(12) United States Patent
Chrostowski

(10) Patent No.: US 9,277,732 B1
(45) Date of Patent: Mar. 8, 2016

(54) FLY MASK FOR HORSES

(71) Applicant: Noble Rider, LLC, Modesto, CA (US)

(72) Inventor: Matthew Edward Chrostowski, Agoura Hills, CA (US)

(73) Assignee: Noble Rider, LLC, Modesto, CA (US)

(*) Notice: Subject to any disclaimer, the term of this patent is extended or adjusted under 35 U.S.C. 154(b) by 0 days.

(21) Appl. No.: 14/627,569

(22) Filed: Feb. 20, 2015

(51) Int. Cl.
*B68C 5/00* (2006.01)
*B68B 7/00* (2006.01)
*A01K 13/00* (2006.01)
*A01M 29/00* (2011.01)

(52) U.S. Cl.
CPC .............. *A01K 13/006* (2013.01); *A01M 29/00* (2013.01); *B68B 7/00* (2013.01); *B68C 5/00* (2013.01)

(58) Field of Classification Search
CPC ........... A01K 13/006; B68C 5/00; B68B 7/00
USPC ........................................ 54/80.1, 80.4, 80.5
See application file for complete search history.

(56) References Cited

U.S. PATENT DOCUMENTS

| | | | |
|---|---|---|---|
| 4,662,156 A | 5/1987 | Oettel | |
| 5,345,751 A | 9/1994 | Edwards | |
| 6,128,891 A * | 10/2000 | McMahon | 54/80.1 |
| 6,216,642 B1 * | 4/2001 | Hung | 119/850 |
| 7,887,826 B2 | 2/2011 | Costa | |
| 8,127,521 B2 | 3/2012 | Cates | |
| 2004/0159083 A1 * | 8/2004 | Andrews | 54/80.5 |
| 2004/0244342 A1 * | 12/2004 | Grogoza et al. | 54/79.4 |
| 2007/0169444 A1 * | 7/2007 | Hung | 54/80.4 |
| 2008/0092497 A1 | 4/2008 | Chang | |
| 2009/0241856 A1 * | 10/2009 | Pressler et al. | 119/850 |
| 2015/0053147 A1 * | 2/2015 | Lippincott | 119/821 |

* cited by examiner

*Primary Examiner* — Son T Nguyen
(74) *Attorney, Agent, or Firm* — Thomas M. Freiburger

(57) ABSTRACT

A fly mask for horses has a cage structure supporting a mesh, the structure being formed of semi-rigid plastic splines which hold the mesh away from the eyes and most of the surfaces of the horse's head. In a preferred form the fly mask has protruding lines at the location of the splines, protecting the mask against excessive wear due to rubbing of the mask against posts or other building structure when worn. A detachable protective nose guard can be included.

17 Claims, 4 Drawing Sheets

FLY MASK FOR HORSES

BACKGROUND OF THE INVENTION

This invention relates to protective coverings for animals, and in particular the invention concerns a fly mask for horses, especially an eye guard, also effective for sun protection.

For large animals, horses tend to be sensitive and to have somewhat frequent veterinary problems. They can have a wide variety of skin problems, caused by environment, trauma, parasites and insects, among other things.

Flies and insects contribute to a number of skin problems and other disease, and can be a constant annoyance to a horse, sometimes contributing to nervous disorders. Also, horses of light color can sunburn, especially on the muzzle and about the eyes.

For insect and sun protection, many different horse masks and blankets have been proposed. Some fly masks have provided good protection against insects and some sun protection, but most fly masks engage against the horse's muzzle, hair and skin, including around the eyes, to such an extent as to annoy or irritate the horse almost to the extent of insects. Typically the masks are loose and unstructured. Horses often rub their heads, muzzles and eye area against posts or fences in an attempt to alleviate the contact or irritation caused by the mask, sometimes rubbing holes through the mask.

The prior art includes a considerable number of fly masks for horses, for protection against insects and sometimes also for sun protection. See, for example, U.S. Pat. Nos. 8,127,521, 6,128,891, 5,345,751, 4,662,156, and U.S. Pub. No. 2008/0092497. Of these patent documents, U.S. Pat. No. 8,127,521 describes a horse mask primarily for sun protection, but also to prevent invasion by insects. The patent describes a stiffening panel above the eyes, to hold the screen mesh away from the eyes. U.S. Pat. No. 6,128,891 shows a protective mask that includes a top portion conforming to the top of the horse's head, with two ear sleeves to receive the ears. A mesh face panel extends essentially from the ears down to the horse's nostrils. The protective mask of U.S. Pat. No. 4,662,156 includes convex eye pockets to hold the mesh away from the horse's eyes.

Another fly mask for horses, called "Rambo Plus Fly Mask", comprises essentially a mesh cover for the ears, head, eyes and muzzle down to the nostrils, with straps to hold the mesh in place. This fly mask is apparently produced by Horseware Ireland and can be seen at the website hopevalleysaddlery.co.uk.

The prior fly mask devices tend to make excessive contact with the horse's face and muzzle, including immediately around the eyes. There is a need for a better protective horse mask, one that makes minimum and non-irritating contact with the horse's head, especially the eyes, while still alleviating the problem of insect infestation and irritation, and providing a degree of sun protection.

SUMMARY OF THE INVENTION

The invention greatly improves over prior horse fly masks with a protective device that includes a mesh or screen covering the head, brow, eyes and most of the muzzle, and optionally the ears, but with the mask device making minimal contact with the horse, due to the action of splines that act as a tenting framework to hold most areas of the mesh outwardly from the horse's muzzle, eyes and skin.

The splines, which are plastic strips retained within fabric channels or structural sleeves (e.g. Nylon) secured to the mesh, include a sagittal spline from the upper forehead down the top of the muzzle down approximately just below the bit position, and two side splines, one at left and one right, approximately at jaw level, extending at each side from a few inches below the ear to just behind the back of the mouth. In addition, a spline extends in the transverse direction, in a generally inverted U-shape, over the brow just above the eyes and with opposed ends connected (directly or indirectly) to the side splines. This brow spline also intersects with and is indirectly connected to the sagittal spline at or just above the upper brow.

The splines are pre-loaded into curving configurations, so as to hold the mesh away from the horse's eyes and skin in most areas, by being confined within the limited length of the fabric slots so that each spline is essentially in compression, prevented from straightening out to its full length. The splines form a cage-like structure floating the mesh above the brow and eyes somewhat in the manner of an arched-rib tent.

The fly mask separates at bottom, generally below the horse's throat. It can be secured together by hook/loop fasteners (VELCRO), which can comprise a double VELCRO connection with three layers. Alternatively, this can be a more secure and more contaminant-resistant closure material, one example of which is 3M DUAL LOCK closure. That material resists clogging by dirt, dust and other environmental particles. A row of snaps or other effective connectors could also be used.

Flexible transverse straps are secured to the fly mask at upper and lower ends, the forward strap intersecting with forward ends of the sagittal and side splines and being secured at bottom, and the upper strap preferably being behind the ears and again being securable at bottom.

The protective mask of the invention, with its spline construction, provides raised lines of relief at the exterior of the splines, that is, lines of slight protrusion from the mesh. These are reinforced so as to act as abrasion-resisting structures, to resist wear of the mesh if the horse rubs its head against posts or fences when wearing the protective mask.

It is an object of the invention to improve over prior protective masks for horses, with a reliable fly mask construction having a mesh that is held away from the horse's eyes, hair and flesh as much as possible via a tenting framework, while also resisting wear in the event the horse tries to rub the mask against posts, etc., and with provision for simple and convenient installation and removal of the mask from the horse. These and other objects, advantages and features of the invention will be apparent from the following description of a preferred embodiment, considered along with the accompanying drawings.

DESCRIPTION OF PREFERRED EMBODIMENTS

Figure 1:
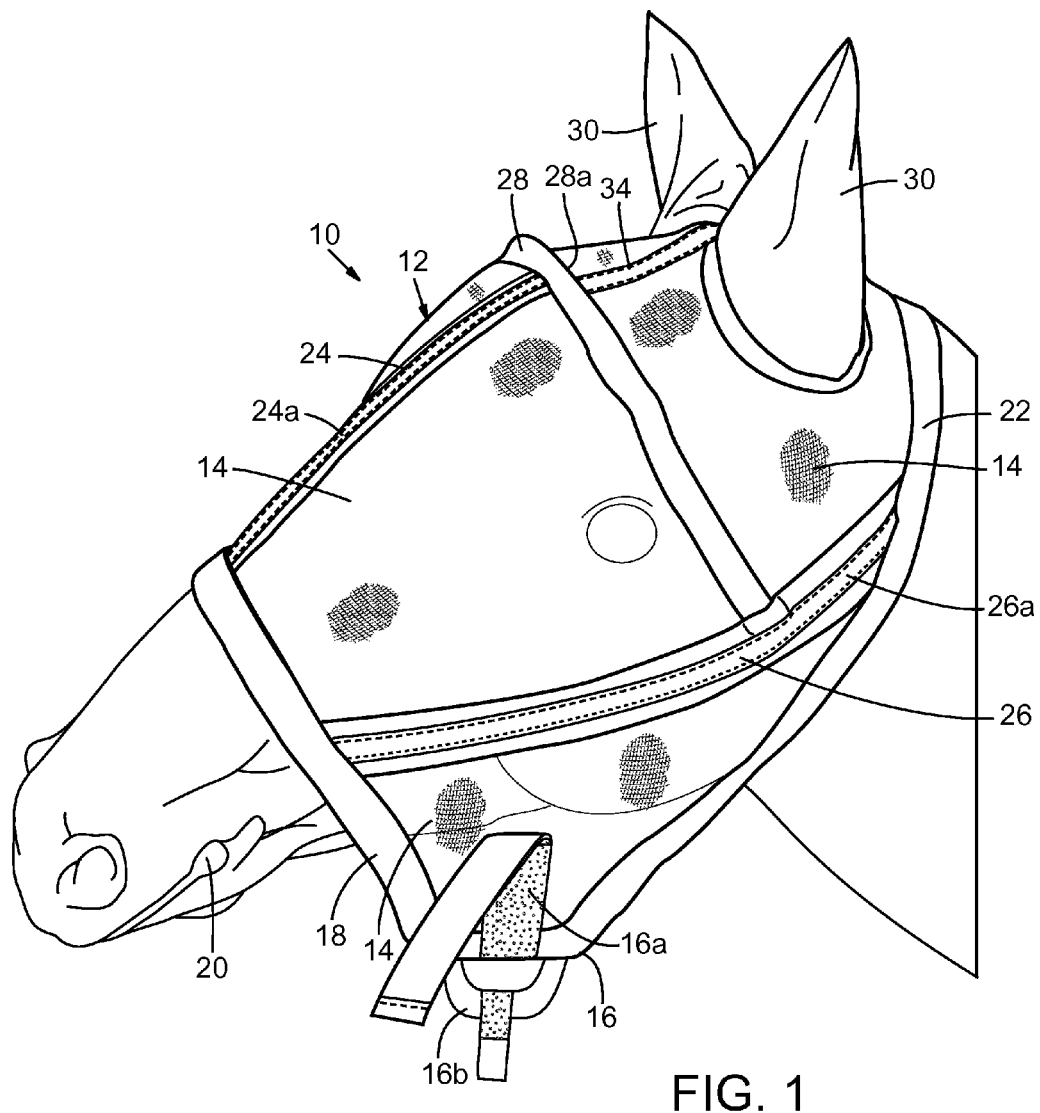
FIG. 1 is a perspective side view showing a protective fly mask of the invention secured on the head of a horse.

FIG. 1 shows a horse 10 wearing the protective fly mask 12 of the invention. As shown in the drawing, the fly mask is primarily constructed of a mesh 14 of appropriate size to keep out flies and irritating insects. It is secured together at a bottom opening 16, via a closure 16a, 16b made by VELCRO hook and loop fasteners or by a more secure and robust closure 3M DUAL LOCK. At one closure side 16a is a patch of preferably loop material, and at the other side a flap or strap 16b with hook material (or vice versa). The mesh, in one preferred embodiment, extends from a front band or strap 18, which wraps around the snout or muzzle a few inches behind the bit position 20 at the back of the mouth, shown at about mid-snout, rearwardly to just behind the ears, at a rear band or strap 22 which, from behind the ears, wraps around the neck and closes, along the rear of the closure, approximately at the throat. Relative to a halter, the front band 18 is approximately at the location of the halter's nose band and the rear band 22 is approximately at the location of the halter's crown piece and throat latch.

As mentioned above, the closure of the bottom opening 16, which is located preferably in about the sagittal plane below the horse's muzzle and back of the neck, can be made with hook and loop fastener (VELCRO) material, and for greater security, this can be a double VELCRO closure, three layers. Thus, one of the closure sides, each of which is comprised of a fabric or webbing strip at the edge of the mesh, can have a double flap, i.e. two parallel strips forming a V, which can be formed of a strap foldable over a VELCRO patch as at 16a. The two opposing faces of the V can have, for example, hook VELCRO material on both sides, facing inwardly. The other closure side has the opposing VELCRO material, e.g. the loop material, on both sides of the single strip, as at 16b. This strip is placed in the V of the other side 16a of the closure and engaged by two VELCRO connections.

The mesh preferably is of woven plastic fibers, with opening size between about 0.7 mm and 2.0 mm, more preferably about 0.8 mm to 1.5 mm, or about 1 mm to 1.2 mm. One preferred type of mesh is TEXTILENE mesh (from Arizona Sun Supply, Inc.), formed of vinyl-coated polyester core yarn and often used for sun shades. The mesh can include an insect repellent incorporated in the outer layer. This can be an insect repellent such as described in Costa U.S. Pat. No. 7,887,826, or a fabric or coating treated with permethrin, a synthetic insecticide, or pyrethroid, a substance similar to a natural chrysanthemum insecticide. Many synthetic fabrics have incorporated compounds that give off a scent (and many plastics in themselves have a scent), and a scent which tends to repel flies is useful in the fly mask of the invention.

The fly mask 12 is held away from the brow and eyes and much of the muzzle and face of the horse, by a plurality of pre-loaded splines, each of which defines a bowed configuration to hold the fly mask away from contact with the horse in most areas of the head. This is in effect a tenting framework or exoskeleton forming a suspended canopy. The splines include a sagittal spline 24, two opposed, left and right side splines 26 extending generally horizontally at about the jaw level, and a brow spline 28 in an inverted U-shape, over the brow. In this preferred embodiment the ears are covered by ear covers 30, which can be a breathable fabric extending up through and sewn to the mesh as indicated. In another embodiment simple ear holes are provided, allowing the ears to be uncovered.

The splines are connected together, which can be indirectly via the fabric or via the structural sleeves 24a, 28a and 26a that connect with the bands 18, 22 and with each other, such as at the brow intersection of splines 24, 28 and at the rear jaw position where the splines 26 and 28 intersect, both sides. Together these splines form a cage that holds the mesh generally in a pre-formed configuration which minimizes contact with the horse's head, especially the eyes. At the brow the brow spline 28 actually arches above the brow, which can be an inch or more away from the brow, supported by the connection with the side or jaw splines 26, thus acting as a support means for the ends of the brow spline. This holds the mesh well away from the eyes. The brow spline 28 preferably tends to push outwardly somewhat on the jaw splines 26, which are themselves preloaded into an arched configuration as shown. Thus, not only the brow spline 28, but also the side or jaw splines 26, through most of their length, float away from the horse's skin.

Preferably each spline is a plastic strip which normally assumes a straight, flat configuration. The plastic material can be an injection molded or extruded polypropylene, polyethylene, or other plastic material that bends elastically through a range of bending, and each spline can be about ¼ inch or so in width and about ⅛ inch more or less in thickness, as an example (but depending on the type and hardness of the material used). The structural sleeves 24a, 26a and 28a are each formed of limited length so as to strictly confine the spline and to force the spline into an arched configuration. The splines are thus preloaded or prestressed into the desired arched configuration. It should be understood, however, that pre-shaped splines could be employed, splines that assume a normal and desired arched configuration before being contained within the sleeves.

Figure 7:
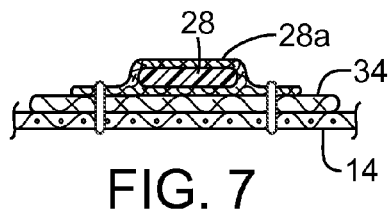
FIGS. 7 and 8 are schematic cross sections showing splines and their retention to the mesh.

FIG. 7 shows a spline and adjacent structure in cross section. The spline itself is shown at 28 (as an example), with the webbing sleeve shown at 28a, confining the plastic spline. A base strip 34 supports the sleeve, and the base is secured to the mesh 14.

Figure 8:
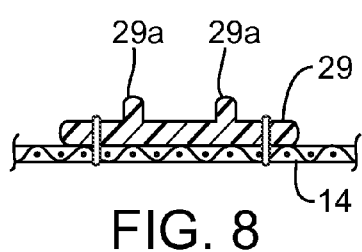

FIG. 8 is another schematic cross section view showing that the splines could take a different form, being stitched to the outside of the mesh 14, either directly or with a base layer between. In this case the splines, again formed of elastically-bendable plastic material, have stitching holes and are stitched to the outside of the mesh. In a preferred embodiment the illustrated spline 29 includes longitudinal ridges 29a that add stiffness to the spline and also serve to provide protruding rubbing surfaces that will engage against a post, fence, etc. if the horse attempts to rub the fly mask against objects. A single ridge 29a could be provided rather than the two parallel ridges shown. Note that if this construction is employed, it is preferred that the splines be preformed in a normal and desired arched configuration, as discussed above.

As secured in the fly mask, the splines exhibit bending strength or resistance within a desired range. For example, a spline of 11 inches length would deflect such that its center is displaced by about one inch when about 4 ounces to one pound of force is applied at center. In another embodiment the center would be displaced two inches when a force of about two to twelve ounces is applied at center. The transverse spline 28, that holds the mesh away from the brow and eyes, preferably is somewhat stiffer, requiring approximately twelve ounces to 1.5 pound force to displace the center of the spline by about one inch.

It should also be understood that the framework defined by the splines could take a different form. For example, the tenting framework could be comprised of a wire frame, with all splines or wires secured together directly at intersections. These could be metal wires, a molded framework system, or splines of another material, fixed into a cage or framework prior to the mesh being secured onto the framework. A wire frame could be woven into the mesh. The mesh could then be connected by any effective means such as being laid over the framework and then secured by strips of structural fabric at inside and outside, so that each spline or wire is held to the mesh, and with the inner strip having a soft layer or cushioning where the horse's head will be contacted.

Figure 2:
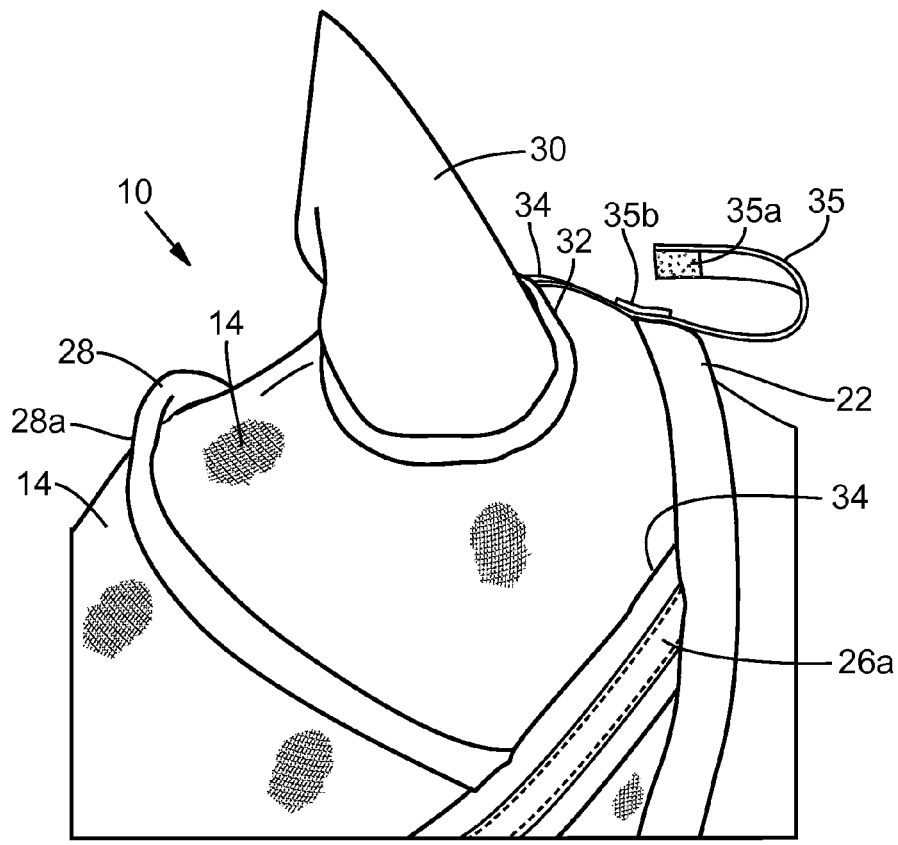
FIG. 2 is a detail view showing an upper portion of the fly mask on the horse.
Figure 3:
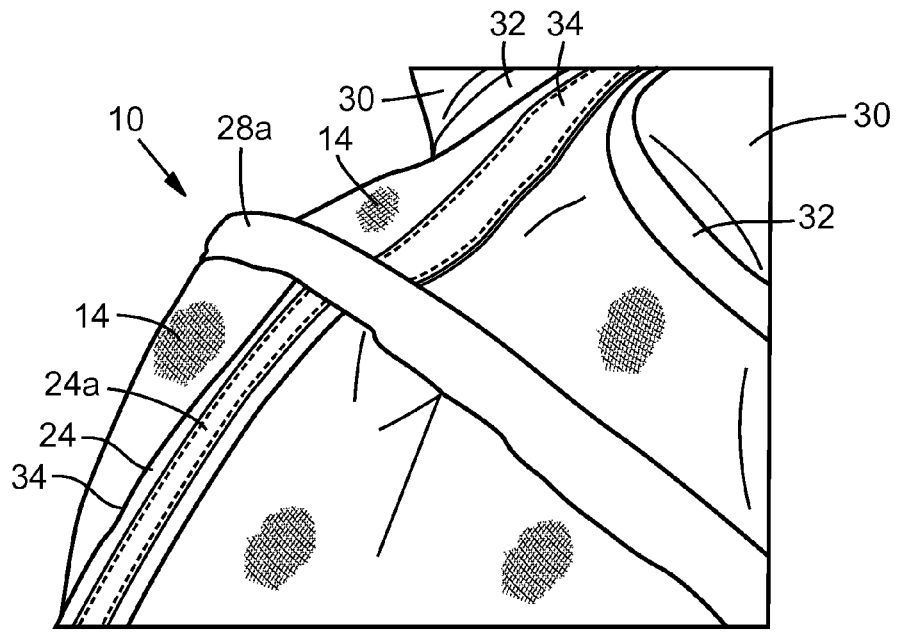
FIG. 3 is a further detail view showing the splines floating the mesh material over the horse's brow.
Figure 4:
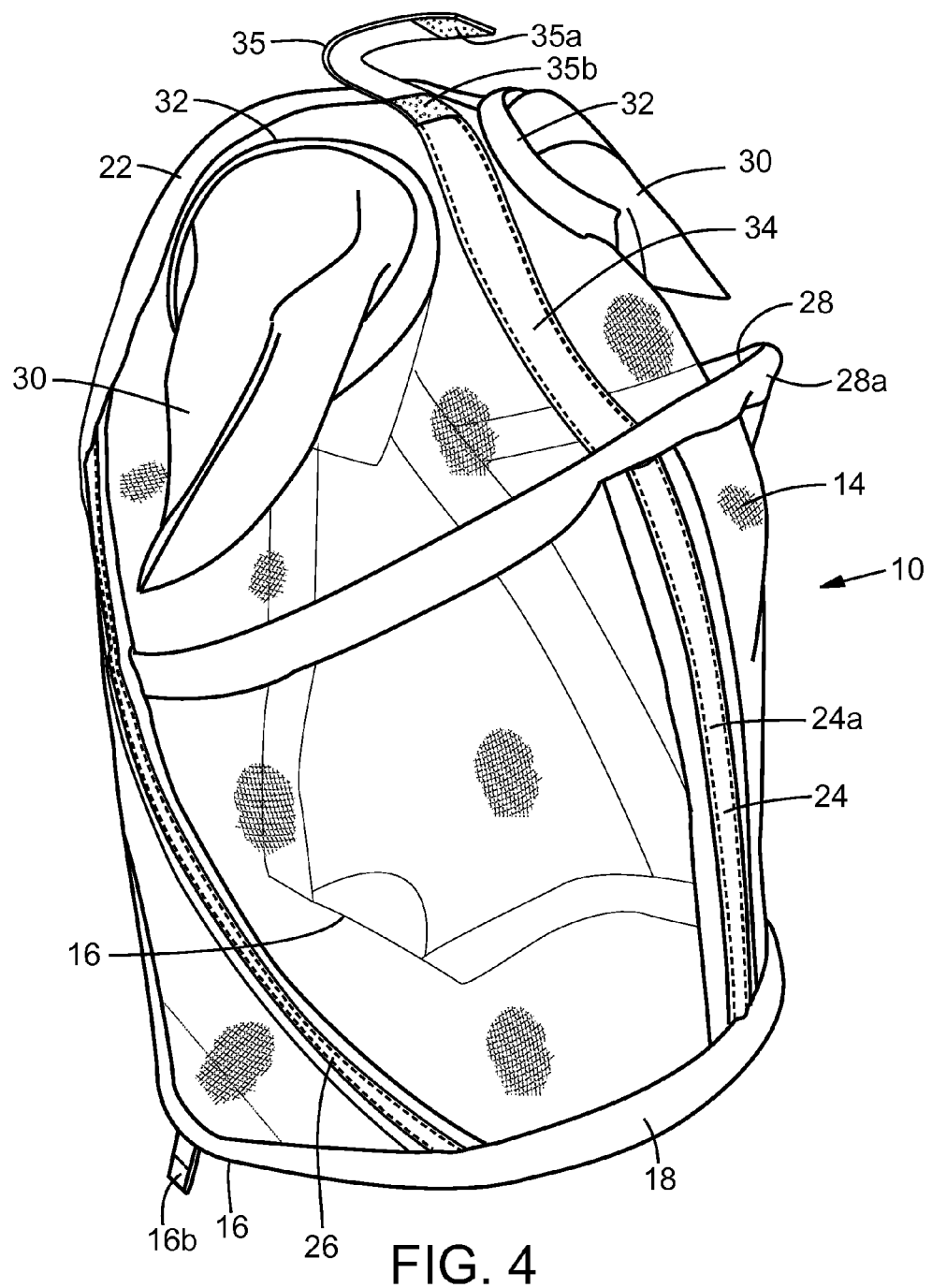
FIG. 4 is a perspective view showing the protective fly mask prior to installation onto a horse.

FIGS. 2, 3 and 4 show details of the fly mask. In FIG. 2 one of two ear sleeves 30 is seen extending upwardly from the mesh 14, secured by stitching to a fabric hem 32 on the mesh. The arched spline sleeve 28a is also seen in better detail, shown with the spline floating the mesh considerably above the horse's brow. The left jaw mesh sleeve 26a is seen secured to a fabric base 34 and connected at the rear end of the spline sleeve 26a to the rear strap 22. The brow spline sleeve 28a connects in a "T" intersection with the jaw spline sleeve 26a, and this occurs at both sides of the head.

A preferred option is a loop tab 35 extending back from the top middle of the fly mask as shown in FIG. 2. This can be an extension of the fabric strip 34 that extends in the sagittal plane, or this can be a webbing strip that extends from just behind the transverse spline sleeve 28a back to intersect with the rear transverse band 22, extending on to be the tab 35 that can be formed into a loop as indicated. The terminal end of the tab 35 can have a VELCRO hook and loop fastener patch 35a so that this end is brought around in loop fashion to be secured at 35b to opposing hook and loop fastener material. In this way the mask can be removed from the horse even at a remote location from the stable while trail riding, and the tab 35 can be looped around the halter, e.g. on the bridle crown piece, or any other strap on the horse to carry it. This loop can also be used to hang the mask in a barn or stable or a horse trailer when unused. The hook/loop fasteners allow quick removal and attachment.

FIG. 3 shows the sagittal spline sleeve 24a, again secured to a base strip 34 and intersecting with and connected to the brow spline sleeve 28a. As indicated, the fabric base strip 34, also in the sagittal plane, preferably extends upwardly (back), between the ears to a connection with the rear strap 22 (intersection not shown). The fabric base strips 34 not only provide a layer for attachment of the spline sleeves, but also aid in construction and in an integrated appearance of the fly mask, by covering necessary seams in the mesh and securing the mesh sections together at such seams.

FIG. 4 shows the protective fly mask aside from the horse, indicating a preloaded, cage-like configuration created by the splines. Even though this tent-like shape tends to be assumed by the influence of the splines, the fly mask 10 can nonetheless be partially compressed by packaging to a configuration which is almost but not totally flat. When removed from the package the illustrated configuration returns.

As mentioned above, although fabric ear covers 30 are shown in the drawings, the invention also encompasses a pair of reinforced ear holes through which the horse's ears will extend, without covering the ears. Some horses will prefer the ears uncovered.

Figure 5:
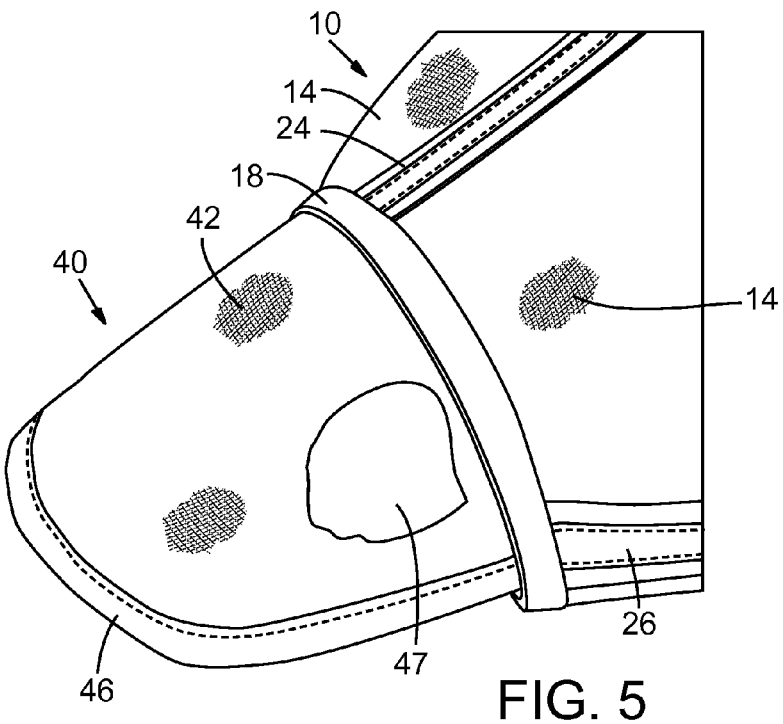
FIGS. 5 and 6 are perspective and plan views showing an optional accessory that can be attached to the fly mask.
Figure 6:
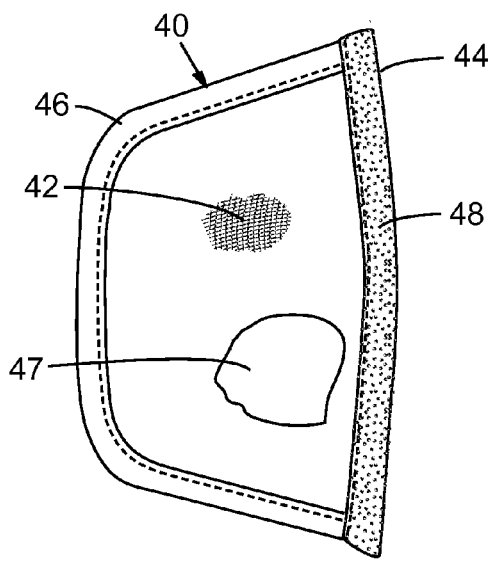

FIGS. 5 and 6 show a variation, an accessory for the fly mask in the form of a protective nose guard 40 that is securable to the front of the fly mask 10 when desired. FIG. 6 shows the accessory 40 alone, in a top view. The nose guard includes a mesh 42 and a border fabric or hem 44, 46 (it can be a single piece of fabric or two pieces). With the mesh is preferably included a UV-protective layer, which may be at the bottom side of the mesh and indicated at 47, providing added sun protection for the sensitive upper nose and muzzle surface of the horse. In a preferred embodiment this nose guard accessory is securable to the forward end of the fly mask 10 by VELCRO hook and loop fastener material, indicated at 48 on the border strip 44, or by other appropriate connection such as snaps. If VELCRO is used, the rougher hook material 48 is located at the top side of the fabric border 44 of the accessory, so as to be securable to loop material (not shown) at the underside of the front band 18 of the fly mask. The nose guard covers the nostrils but does not wrap around the muzzle.

The above described preferred embodiments are intended to illustrate the principles of the invention, but not to limit its scope. Other embodiments and variations to these preferred embodiments will be apparent to those skilled in the art and may be made without departing from the spirit and scope of the invention as defined in the following claims.

I claim:

1. An equine fly mask assembly to shield a horse's head, eyes and upper snout from flies and other insects, comprising:
    a flexible mesh with openings to allow air flow but a barrier to flies, of sufficient size to cover the horse's head from at least the brow down to the mid-snout of the horse,
    a plurality of semi-rigid splines forming a cage configured to hold the mesh away from the surface of the horse's head so as to prevent the mesh from pressing against most of the surface over which it lies, including the eyes, the semi-rigid splines including a sagittal spline positioned to lie centrally on the horse's head and extending at least from the brow and down to a forward edge of the mesh, a pair of opposed side splines extending generally horizontally from approximately below the ear, to just behind a rear edge of the horse's mouth at the forward edge of the mesh, and a transverse brow spline extending essentially perpendicularly to the sagittal spline and across the upper end of the sagittal spline with each of two ends of the transverse brow spline terminating at one of the side splines,
    each spline comprising an elastically bendable strip of different material from the mesh and attached to the mesh and being in an arched configuration so as to bow outwardly from the horse, the splines being connected and holding most of the mesh away from the horse including at the eyes,
    a forward transverse strap secured to the forward edge of the mesh to essentially encircle the snout and jaw region of the horse's head, and
    a closure means for closing the mesh at a bottom side of the mesh.

2. The equine fly mask of claim 1,
    wherein the splines provide lines of outward protrusion from the mesh, minimizing wear of the mesh due to rubbing against posts or other surfaces by a horse wearing the mask.

3. The equine fly mask of claim 1, wherein the mesh is of woven plastic fiber material, with opening size about 0.5 to 1.5 mm.

4. The equine fly mask of claim 1, wherein the mesh is of woven plastic fiber material, with opening size about 0.8 mm.

5. The equine fly mask of claim 1, wherein the mesh includes ear holes for the horse's ears, with a soft, breathable fabric ear cover extending out from each ear hole to receive a horse's ears.

6. The equine fly mask of claim 1, wherein the splines are of a molded or extruded polymer, with a bending stiffness such that bending an arched spline to displace the spline by two inches at center requires about two to twelve ounces of force applied at center.

7. The equine fly mask of claim 1, wherein the mesh extends back to a position to be behind a horse's ears.

8. The equine fly mask of claim 7, including a flexible rear strap secured at a rear side of the mesh and positioned to extend around a horse's neck.

9. The equine fly mask of claim 1, wherein the brow spline forms an arch sufficient to hold the mesh at least one inch above the horse's brow and above the horse's eyes, with ends of the brow spline intersecting with the side splines at a position at least two inches forward of the rear ends of the side splines.

10. The equine fly mask of claim 1, further including a detachable protective nose guard configured to extend forward from the forward transverse strap, the nose guard being removably secured to the forward transverse strap by quick-release fasteners.

11. The equine fly mask of claim 10, wherein the protective nose guard is of a length to cover the horse's nostrils.

12. The equine fly mask of claim 10, wherein the protective nose guard is formed of mesh, with a layer of sun protective material.

13. The equine fly mask of claim 10, wherein the quick-release fasteners comprise hook and loop fasteners.

14. The equine fly mask of claim 1, wherein the splines are each retained and confined in elongated sleeves secured to the mesh and stressed by limited length of the sleeves such that the splines are forced into an arched configuration.

15. The equine fly mask of claim 1, wherein each spline is preformed in an arched configuration, and is stitched to the mesh exteriorly.

16. The equine fly mask of claim 1, wherein the mask includes an insect repellent which repels flies.

17. A fly mask assembly configured to fit over and to shield the head, eyes and upper snout of a horse from flies and other insects, comprising:

a flexible mesh with openings of a size to provide a barrier to flies, and the flexible mesh being large enough to cover the horse's head from the ears approximately to the throat of the horse, a plurality of semi-rigid splines connected together and forming a cage configured to hold the mesh away from surfaces of the horse's head thus to prevent the mesh from pressing against most of the surfaces over which it lies, including the eyes, each semi-rigid spline comprising an elastically bendable strip of different material from the mesh and attached to the mesh, the semi-rigid splines including a sagittal spline positioned to lie centrally over the horse's head when worn, and configured to extend at least from the horse's brow and down to a forward edge of the mesh, and a transverse brow spline connected to an upper end of the sagittal spline and extending essentially perpendicularly to the sagittal spline with each of two ends of the transverse brow spline extending down approximately to the level of the horse's jaw when worn, each spline being in an arched configuration so as to bow outwardly from the horse when worn, holding most of the mesh away from the horse including at the eyes, with the brow spline's ends tending to push outwardly from the horse when worn, and including support means secured to the mesh for restricting outward movement of the ends of the brow spline, a forward transverse strap secured to the forward edge of the mesh to essentially encircle the snout and jaw region of the horse's head when worn, and closure means for securing the forward transverse strap and the mesh together at a bottom side of the mesh.

\* \* \* \* \*